A. S. LANE & S. KENLEY.
MEASURING INSTRUMENT.
APPLICATION FILED JAN. 28, 1908.
903,484.
Patented Nov. 10, 1908.
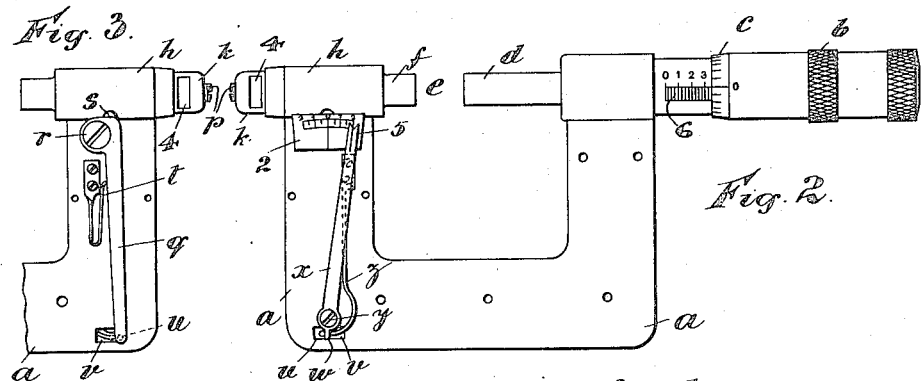
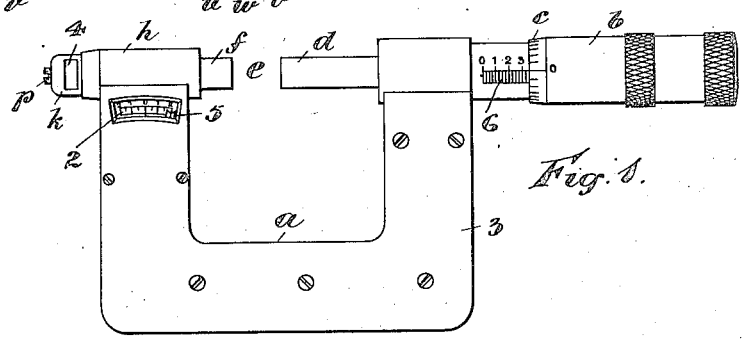
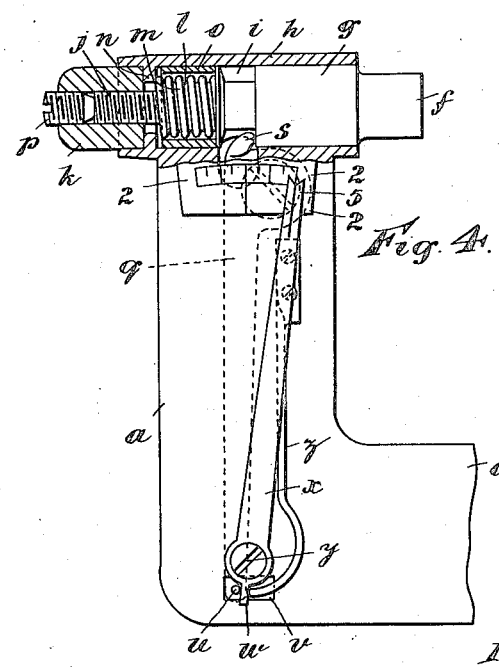
Witnesses.
Stephen Edward Gunyon.
William Anderson Smith.
Inventors.
Arthur Smythe Lane.
Stanley Kenley.

UNITED STATES PATENT OFFICE.

ARTHUR SMYTHE LANE, OF CHISWICK, AND STANLEY KENLEY, OF ACTON, ENGLAND.

MEASURING INSTRUMENT.

No. 903,484.	Specification of Letters Patent.	Patented Nov. 10, 1908.

Application filed January 28, 1908. Serial No. 413,139.

*To all whom it may concern:*

Be it known that we, ARTHUR SMYTHE LANE and STANLEY KENLEY, respectively a subject of the King of Great Britain and a subject of the Emperor of Germany, residing, respectively, at Chiswick and Acton, both in the county of Middlesex, England, have invented new and useful Improvements in Measuring Instruments, of which the following is a specification.

This invention relates to improvements in measuring instruments more especially of that class in which the object to be measured is placed between two jaws one of which is fixed and the other adjustable towards and from the object by means of a screw, the number of revolutions or travel of which indicates on suitable scales or verniers the exact distance between the fixed and movable jaws at any moment, that is to say the exact space occupied by the object to be measured. Such instruments are adapted for measuring internal measurements (such as the internal diameter of a tube for example) or external measurements (such as the diameter of a shaft for example).

According to the present invention means are provided by which any inaccuracy, within certain fixed limits, of the object to be measured, is clearly and visibly indicated in a simple and direct manner.

Figure 1 of the accompanying drawings illustrates a side view of a measuring instrument with our improvements applied thereto; Fig. 2 is a similar view to Fig. 1, but with the cover plate on one side of the instrument removed; Fig. 3 is a similar view of the reverse side of one end portion only of the instrument with the cover plate removed; and Fig. 4 is an elevation partly in section of the end portion only of the instrument as in Fig. 2, but drawn to a larger scale than in that figure.

Similar letters of reference relate to like parts in all the figures of the drawings.

$a$ is the U-shaped frame of the instrument, $b$ the milled head of the revolving screwed portion with the ordinary circumferential scale $c$ on the edge thereof. The inner end $d$ of this milled head $b$ forms one of the measuring jaws, the space $e$ between which and the jaw $f$ is increased or diminished according to the direction of rotation of the milled head $b$ as is well understood in connection with this class of measuring instrument.

Instead of the jaw $f$ being a fixed abutment, as has been the case heretofore, it forms part of a spring plunger $g$ mounted in the head $h$ of the instrument, as seen clearly in Fig. 4.

$i$ is an annular recess formed in the plunger $g$, and $j$ is the reduced tail end of the plunger screw-threaded to receive the screw cap $k$.

$l$ is a helical compression spring surrounding the reduced portion $m$ of the plunger $g$ and bearing at its inner end upon the end of the plunger as shown, and at its outer end on the inner surface of the internal flange $n$ of the head $h$.

$o$ is a loose sleeve sliding in the interior of the head $h$ and surrounding the spring $l$. It will be understood that this sliding sleeve $o$ limits the amount of movement of the plunger $g$ against the action of the helical spring $l$ when the said plunger is forced to the left hand in Fig. 4, the movement of the plunger $g$ to the right hand in the same figure being limited by the screw cap $k$ bearing at its inner end upon the external surface of the internal flange $n$.

The space in which the sleeve $o$ slides may be increased or diminished by screwing the screw cap $k$ on the tail end $j$ of the plunger $g$, the said screw cap $k$ bearing at its inner end upon the exterior surface of the internal flange $n$ and drawing the plunger $g$ to the left hand in Fig. 4 or vice versa against the resistance of the spring $l$ when regulating the instrument.

$p$ is a set or locking screw bearing at its inner end upon the reduced end of the plunger $g$, and by which the predetermined position of the screwed cap $k$ in relation to the plunger $g$, that is to say the amount of movement of the sleeve $o$, may be accurately set.

$q$ is a downwardly projecting lever pivoted at $r$ to the frame $a$, as shown in full lines in Fig. 3, and in dotted lines in Fig. 4, and having a spur or talon $s$ which passes through a hole in the head $h$ and enters the beforementioned annular recess $i$ bearing against the side of such recess as seen clearly in Fig. 4, and retained in that position by means of the spring $t$ as shown in Fig. 3. At the lower end of the lever $q$ is a pin $u$ which passes through a hole $v$ in the frame $a$, and engages with the short end $w$ of a second lever $x$ which is pivoted at $y$ to the frame $a$ and extends in an upward direction as shown in Figs. 2 and 4, its short end $w$ being caused to bear against the pin $u$ of the lever $q$ by means of the spring $z$. The upper end of the lever $x$ forms an index finger 5 which traverses the graduated segmental scale 2 as will be hereinafter explained. The levers $q$ and $x$ with their accompanying parts are inclosed in hollows or recesses formed in the back surfaces of vulcanite or other suitable cover plates 3 which are secured to each side of the frame $a$ by screws or otherwise as shown in Fig. 1.

In order to set the index finger 5 at the end of the lever $x$ at the desired normal position in relation to the graduated segmental scale 2, the set or locking screw $p$ is slackened back and the screw cap $k$ is turned in the appropriate direction, by which the levers $q$ and $x$ are moved as desired through the spur or talon $s$, and when set at the desired position the screw cap $k$ is locked by means of the screw $p$, the screw cap $k$ being suitably held stationary by the flat surfaces 4.

If the milled head $b$ is turned until the end surfaces of the jaws $d$ and $f$ make "mechanical touch" and the index finger 5 at the end of the lever $x$ is set so that it stands at the numeral 2 on the right hand side of the graduated scale 2, as in Figs. 1 and 2, the zero mark of the circumferential scale $c$ on the inner graduated edge of the milled head $b$ will stand at two divisions below the longitudinal base or zero line of the fixed longitudinal scale 6; and in order to make these two zero lines coincide it will be necessary to further turn the milled head $b$ forward by the space of two divisions of its scale $c$, thereby forcing the jaw $f$ and plunger $g$ to the left hand in Figs. 1 and 2 against the resistance of the helical spring $l$ and moving the index finger 5 at the end of the lever $x$ into the zero position on the graduated segmental scale 2.

The apparatus may be employed in a variety of ways according to requirements. In Fig. 1, for example, the milled head $b$ has been turned into such a position that the reading of the rotating circumferential scale $c$ in relation to the fixed longitudinal scale 6 indicates 350 thousandths of an inch, but the actual space $e$ between the end surfaces of the jaws $d$ and $f$ will be 348 thousandths of an inch. If the object to be measured (and which is supposed to measure exactly 350 thousandths of an inch) be placed between the jaws, the jaw $f$ being forced inwards against the resistance of the helical spring $l$, the said object will be held in "mechanical touch" by the jaws $d$ and $f$. If the object is of accurate length, the index finger 5 at the end of the lever $x$ will now stand at the zero line of the graduated segmental scale 2, but if it is short of the required length, the said finger will indicate the amount of such deficiency in one thousandths of an inch to the right hand of the zero line of that scale, or any excess of the required length to the left of the said line.

By the employment of this instrument objects may be accurately measured by sight only in a very simple and expeditious manner instead of relying upon testing by touch as heretofore, and all risk of forcing the jaws against the object to be measured is obviated within practical limits.

Claim.

A measuring instrument of the kind described which consists of a frame $a$, a jaw $d$ with rotating head $b$ and circumferential scale $c$, a fixed longitudinal scale 6, a jaw $f$ with sliding plunger $g$ and recess $i$, a spring $l$, a sleeve $o$, a screwed tail end $j$ of plunger $g$, a screw cap $k$, a set or locking screw $p$, a spring-urged lever $q$ with spur or talon $s$ engaging with recess $i$, a pin $u$ on lever $q$, a spring-urged lever $x\ w$ engaging with pin $u$ and terminating in an index finger 5, and a scale 2, substantially as described.

In testimony whereof we have signed our names to this specification in the presence of two subscribing witnesses.

ARTHUR SMYTHE LANE.
STANLEY KENLEY.

Witnesses:
F. L. RAND,
R. O. WILLIAMS.